(12) United States Patent
Gawthrop

(10) Patent No.: US 7,870,892 B2
(45) Date of Patent: Jan. 18, 2011

(54) CLIMATE CONTROL METHOD FOR HYBRID VEHICLES USING THERMOELECTRIC DEVICES

(75) Inventor: Peter R. Gawthrop, Troy, MI (US)

(73) Assignee: BSST LLC, Irwindale, CA (US)

( * ) Notice: Subject to any disclaimer, the term of this patent is extended or adjusted under 35 U.S.C. 154(b) by 434 days.

(21) Appl. No.: 12/131,853

(22) Filed: Jun. 2, 2008

(65) Prior Publication Data
US 2008/0230618 A1  Sep. 25, 2008

Related U.S. Application Data

(62) Division of application No. 10/842,109, filed on May 10, 2004, now Pat. No. 7,380,586.

(51) Int. Cl.
  B60H 1/12 (2006.01)
  B60H 1/03 (2006.01)
  B60H 1/20 (2006.01)
  B60H 1/32 (2006.01)
  F25B 29/00 (2006.01)

(52) U.S. Cl. .................. 165/271; 165/202; 165/42; 165/43; 180/65.1; 180/65.21; 180/65.8; 62/3.2; 62/3.3; 62/3.61; 62/3.7; 62/244

(58) Field of Classification Search .......... 165/271, 165/202, 42, 43; 180/65.1, 65.21, 65.8; 62/3.2, 62/3.3, 3.61, 3.7, 244
See application file for complete search history.

(56) References Cited

U.S. PATENT DOCUMENTS 2,984,077 A  5/1961  Gaskill (Continued)

FOREIGN PATENT DOCUMENTS

CN  1050358 A  4/1991

(Continued)

OTHER PUBLICATIONS

Derwent-ACC-No. 1998-283540, Kwon, H et al., Hyundai Motor Co., corresponding to KR 97026106 A, published Jun. 24, 1997 (2 pages).

(Continued)

*Primary Examiner*—John K Ford
(74) *Attorney, Agent, or Firm*—Knobbe Martens Olson & Bear, LLP

(57) ABSTRACT

The present invention provides a system for controlling the climate of a hybrid vehicle. The system includes a thermoelectric module, a heat exchanger, a pump, and a valve. The thermoelectric module includes thermoelectric elements powered by electric energy. The thermoelectric elements emit or absorb heat energy based on the polarity of the electrical energy provided. A tube containing coolant runs proximate the thermoelectric elements. To aid in the transfer of heat energy, a blower is provided to generate an air flow across the thermoelectric elements and the tube. The coolant is provided from the thermoelectric module to a heat exchanger that heats or cools the air flow provided to the cabin of the vehicle. The pump and valve are in fluid communication with the heat exchanger and thermoelectric module. The pump pressurizes the coolant flow through the tube and coolant lines. In a cooling mode, the valve is configured to selectively bypass the engine coolant system of the vehicle.

7 Claims, 2 Drawing Sheets

U.S. PATENT DOCUMENTS

| | | | |
|---|---|---|---|
| 3,085,405 A | 4/1963 | Frantti | |
| 3,125,860 A | 3/1964 | Reich | |
| 3,137,142 A | 6/1964 | Venema | |
| 3,138,934 A | 6/1964 | Roane | |
| 3,236,056 A | 2/1966 | Phillips et al. | |
| 3,252,504 A | 5/1966 | Newton | |
| 3,527,621 A | 9/1970 | Newton | |
| 3,635,037 A | 1/1972 | Hubert | |
| 3,681,929 A | 8/1972 | Schering | |
| 3,779,307 A | 12/1973 | Weiss et al. | |
| 3,885,126 A | 5/1975 | Sugiyama et al. | |
| 4,038,831 A | 8/1977 | Gaudel et al. | |
| 4,047,093 A | 9/1977 | Levoy | |
| 4,065,936 A | 1/1978 | Fenton et al. | |
| 4,402,188 A | 9/1983 | Skala | |
| 4,444,851 A | 4/1984 | Maru | |
| 4,448,028 A | 5/1984 | Chao et al. | |
| 4,494,380 A | 1/1985 | Cross | |
| 4,634,803 A | 1/1987 | Mathiprakasam | |
| 4,665,707 A | 5/1987 | Hamilton | |
| 4,753,682 A * | 6/1988 | Cantoni .................. 165/42 | |
| 4,823,554 A | 4/1989 | Trachtenberg et al. | |
| 4,848,090 A | 7/1989 | Peters | |
| 4,858,069 A | 8/1989 | Hughes | |
| 4,905,475 A | 3/1990 | Tuomi | |
| 4,922,721 A | 5/1990 | Robertson et al. | |
| 4,922,998 A | 5/1990 | Carr | |
| 5,029,446 A | 7/1991 | Suzuki | |
| 5,038,569 A | 8/1991 | Shirota et al. | |
| 5,092,129 A | 3/1992 | Bayes et al. | |
| 5,097,829 A | 3/1992 | Quisenberry | |
| 5,111,664 A | 5/1992 | Yang | |
| 5,119,640 A | 6/1992 | Conrad | |
| 5,167,129 A | 12/1992 | Akasaka | |
| 5,180,293 A | 1/1993 | Hartl | |
| 5,193,347 A | 3/1993 | Apisdorf | |
| 5,232,516 A | 8/1993 | Hed | |
| 5,291,960 A | 3/1994 | Brandenburg et al. | |
| 5,316,078 A | 5/1994 | Cesaroni | |
| 5,385,020 A | 1/1995 | Gwilliam et al. | |
| 5,407,130 A | 4/1995 | Uyeki et al. | |
| 5,419,980 A | 5/1995 | Okamoto et al. | |
| 5,431,021 A | 7/1995 | Gwilliam et al. | |
| 5,450,894 A | 9/1995 | Inoue et al. | |
| 5,483,807 A | 1/1996 | Abersfelder et al. | |
| 5,499,504 A | 3/1996 | Mill et al. | |
| 5,549,153 A | 8/1996 | Baruschke et al. | |
| 5,566,774 A | 10/1996 | Yoshida | |
| 5,592,363 A | 1/1997 | Atarashi et al. | |
| 5,653,111 A | 8/1997 | Attey et al. | |
| 5,713,426 A | 2/1998 | Okamura | |
| 5,722,249 A | 3/1998 | Miller, Jr. | |
| 5,725,048 A | 3/1998 | Burk et al. | |
| 5,802,856 A | 9/1998 | Schaper et al. | |
| 5,890,371 A | 4/1999 | Rajasubramanian et al. | |
| 5,901,572 A | 5/1999 | Peiffer et al. | |
| 5,921,088 A | 7/1999 | Imaizumi et al. | |
| 5,964,092 A | 10/1999 | Tozuka et al. | |
| 5,966,941 A | 10/1999 | Ghoshal | |
| 5,977,785 A | 11/1999 | Burward-Hoy | |
| 5,987,890 A | 11/1999 | Chiu et al. | |
| 6,050,326 A | 4/2000 | Evans | |
| 6,059,198 A | 5/2000 | Moroi et al. | |
| 6,105,659 A | 8/2000 | Pocol et al. | |
| 6,119,463 A | 9/2000 | Bell | |
| 6,122,588 A | 9/2000 | Shehan et al. | |
| 6,127,766 A | 10/2000 | Roidt | |
| 6,138,749 A | 10/2000 | Kawai et al. | |
| 6,158,225 A | 12/2000 | Muto et al. | |
| 6,203,939 B1 | 3/2001 | Wilson | |
| 6,205,805 B1 | 3/2001 | Takahashi et al. | |
| 6,213,198 B1 | 4/2001 | Shikata et al. | |
| 6,223,539 B1 | 5/2001 | Bell | |
| 6,230,496 B1 | 5/2001 | Hofmann et al. | |
| 6,270,015 B1 * | 8/2001 | Hirota ................... 62/3.2 | |
| 6,282,907 B1 | 9/2001 | Ghoshal | |
| 6,302,196 B1 | 10/2001 | Haussmann | |
| 6,324,860 B1 | 12/2001 | Maeda et al. | |
| 6,334,311 B1 | 1/2002 | Kim et al. | |
| 6,347,521 B1 | 2/2002 | Kadotani et al. | |
| 6,366,832 B2 | 4/2002 | Lomonaco et al. | |
| 6,385,976 B1 | 5/2002 | Yamamura et al. | |
| 6,393,842 B2 | 5/2002 | Kim | |
| 6,401,462 B1 | 6/2002 | Bielinski | |
| 6,407,435 B1 | 6/2002 | Ma et al. | |
| 6,412,287 B1 | 7/2002 | Hughes et al. | |
| 6,457,324 B2 | 10/2002 | Zeigler et al. | |
| 6,464,027 B1 | 10/2002 | Dage et al. | |
| 6,481,213 B2 | 11/2002 | Carr et al. | |
| 6,499,306 B2 | 12/2002 | Gillen | |
| 6,510,696 B2 | 1/2003 | Guttman et al. | |
| 6,530,231 B1 | 3/2003 | Nagy et al. | |
| 6,539,725 B2 | 4/2003 | Bell | |
| 6,539,729 B2 | 4/2003 | Tupis et al. | |
| 6,548,750 B1 | 4/2003 | Picone | |
| 6,554,088 B2 | 4/2003 | Severinsky et al. | |
| 6,560,968 B2 | 5/2003 | Ko | |
| RE38,128 E | 6/2003 | Gallup et al. | |
| 6,598,403 B1 | 7/2003 | Ghoshal | |
| 6,598,405 B2 | 7/2003 | Bell | |
| 6,605,773 B2 | 8/2003 | Kok et al. | |
| 6,606,877 B2 | 8/2003 | Tomita et al. | |
| 6,611,115 B2 | 8/2003 | Wakashiro et al. | |
| 6,625,990 B2 | 9/2003 | Bell | |
| 6,672,076 B2 | 1/2004 | Bell | |
| 6,682,844 B2 | 1/2004 | Gene | |
| 6,705,089 B2 | 3/2004 | Chu et al. | |
| 6,722,139 B2 | 4/2004 | Moon et al. | |
| 6,732,534 B2 | 5/2004 | Spry | |
| 6,779,348 B2 | 8/2004 | Taban | |
| 6,792,259 B1 | 9/2004 | Parise | |
| 6,796,399 B2 | 9/2004 | Satou et al. | |
| 6,803,766 B2 | 10/2004 | Kobayashi et al. | |
| 6,810,977 B2 | 11/2004 | Suzuki | |
| 6,812,395 B2 | 11/2004 | Bell | |
| 6,862,892 B1 | 3/2005 | Meyer et al. | |
| 6,880,346 B1 | 4/2005 | Tseng et al. | |
| 6,886,356 B2 | 5/2005 | Kubo et al. | |
| 6,894,369 B2 | 5/2005 | Irino et al. | |
| 6,896,047 B2 | 5/2005 | Currle et al. | |
| 6,907,739 B2 | 6/2005 | Bell | |
| 6,942,728 B2 | 9/2005 | Caillat et al. | |
| 6,948,321 B2 | 9/2005 | Bell | |
| 6,973,799 B2 | 12/2005 | Kuehl et al. | |
| 6,975,060 B2 | 12/2005 | Styblo et al. | |
| 7,007,491 B2 | 3/2006 | Grimm et al. | |
| 7,089,756 B2 | 8/2006 | Hu | |
| 7,134,288 B2 | 11/2006 | Crippen et al. | |
| 7,231,772 B2 | 6/2007 | Bell | |
| 7,246,496 B2 | 7/2007 | Goenka et al. | |
| 7,310,953 B2 | 12/2007 | Pham et al. | |
| 7,380,586 B2 | 6/2008 | Gawthrop | |
| 7,426,835 B2 | 9/2008 | Bell et al. | |
| 2003/0140636 A1 | 7/2003 | Van Winkle | |
| 2004/0045594 A1 | 3/2004 | Hightower | |
| 2004/0076214 A1 | 4/2004 | Bell et al. | |
| 2004/0093889 A1 | 5/2004 | Bureau et al. | |
| 2004/0237541 A1 | 12/2004 | Murphy | |
| 2004/0267408 A1 | 12/2004 | Kramer | |
| 2005/0067862 A1 | 3/2005 | Iqbal et al. | |
| 2005/0074646 A1 | 4/2005 | Rajashekara et al. | |
| 2005/0081834 A1 | 4/2005 | Perkins | |
| 2005/0139692 A1 | 6/2005 | Yamamoto | |
| 2005/0178128 A1 | 8/2005 | Harwood et al. | |

| | | | | | | |
|---|---|---|---|---|---|---|
| 2005/0247336 | A1 | 11/2005 | Inaoka | GB | 2 267 338 | 12/1993 |
| 2005/0257531 | A1 | 11/2005 | Kadle et al. | JP | 39-27735 | 12/1964 |
| 2005/0263176 | A1 | 12/2005 | Yamaguchi et al. | JP | 56-18231 | 2/1981 |
| 2005/0268621 | A1 | 12/2005 | Kadle et al. | JP | 4-165234 | 6/1992 |
| 2005/0278863 | A1 | 12/2005 | Bahash et al. | JP | 7 156645 | 6/1995 |
| 2005/0279105 | A1 | 12/2005 | Pastorino | JP | 07-253224 | 10/1995 |
| 2006/0005548 | A1 | 1/2006 | Ruckstuhl | JP | 9-089284 A | 4/1997 |
| 2006/0075758 | A1 | 4/2006 | Rice et al. | JP | 09-254630 | 9/1997 |
| 2006/0150657 | A1 | 7/2006 | Spurgeon et al. | JP | 10035268 | 2/1998 |
| 2006/0174633 | A1 | 8/2006 | Beckley | JP | 10238406 A | 9/1998 |
| 2006/0188418 | A1 | 8/2006 | Parks et al. | JP | 2000-161721 | 6/2000 |
| 2006/0225441 | A1 | 10/2006 | Goenka et al. | JP | 2000-274788 | 6/2000 |
| 2006/0254285 | A1 | 11/2006 | Lin | JP | 2001304778 | 10/2001 |
| 2007/0000255 | A1 | 1/2007 | Elliot et al. | JP | 2002-13758 | 1/2002 |
| 2007/0017666 | A1 | 1/2007 | Goenka et al. | JP | 2002059736 A | 2/2002 |
| 2007/0056295 | A1 | 3/2007 | De Vilbiss | JP | 2003175720 A | 6/2003 |
| 2007/0214799 | A1 | 9/2007 | Goenka | JP | 2005-212564 | 11/2005 |
| 2007/0272290 | A1 | 11/2007 | Sims et al. | SE | 337 227 | 5/1971 |
| 2008/0028768 | A1 | 2/2008 | Goenka | WO | WO 95/01500 | 1/1995 |
| 2008/0028769 | A1 | 2/2008 | Goenka | WO | WO 9722486 A1 | 6/1997 |
| 2008/0230618 | A1 | 9/2008 | Gawthrop | WO | WO 97/47930 | 12/1997 |
| 2008/0250794 | A1 | 10/2008 | Bell | WO | WO 9856047 A1 | 12/1997 |
| 2009/0000310 | A1 | 1/2009 | Bell et al. | WO | WO 99/10191 | 3/1999 |
| 2009/0007572 | A1 | 1/2009 | Bell et al. | WO | WO 99/58907 | 11/1999 |
| 2010/0052374 | A1 | 3/2010 | Bell | WO | WO 02/00458 | 1/2002 |
| 2010/0101238 | A1 | 4/2010 | LaGrandeur et al. | WO | WO 03/014634 | 2/2003 |
| 2010/0101239 | A1 | 4/2010 | LaGrandeur et al. | WO | WO 2005/023571 | 3/2005 |
| | | | | WO | WO 2006/037178 A | 4/2006 |
| | | FOREIGN PATENT DOCUMENTS | | WO | WO 2006/064432 | 6/2006 |
| CN | | 1195090 | 10/1998 | WO | WO 2007/001289 | 1/2007 |
| DE | | 13 01 454 | 8/1969 | WO | WO 2008/148042 | 12/2009 |
| DE | | 2319155 | 10/1974 | WO | WO 2010/048575 | 4/2010 |
| DE | | 199 51 224 | 5/2001 | | | |
| EP | | 0 389 407 | 9/1990 | | | |
| EP | | 0418995 B1 | 3/1991 | | | |
| EP | | 0 545 021 | 6/1993 | | | |
| FR | | 2806666 | 9/2001 | | | |
| FR | | 2 879 728 | 6/2006 | | | |
| GB | | 1 040 485 | 8/1966 | | | |

OTHER PUBLICATIONS

Lofy, John et al., "Thermoelectrics for Environmental Control Automobiles," 21st International Conference on Thermoelectronics, 2002, p. 471-476.

\* cited by examiner

CLIMATE CONTROL METHOD FOR HYBRID VEHICLES USING THERMOELECTRIC DEVICES

CROSS-REFERENCE TO RELATED APPLICATIONS

This application is a divisional of U.S. patent application Ser. No. 10/842,109, filed May 10, 2004, entitled CLIMATE CONTROL SYSTEM FOR HYBRID VEHICLES USING THERMOELECTRIC DEVICES, the entire contents of which are hereby incorporated by reference herein and made a part of this specification.

BACKGROUND

1. Field

The present invention generally relates to a climate control system for hybrid vehicles.

2. Description of Related Art

Hybrid vehicles, vehicles driven by both an internal combustion engine and an electric motor, are becoming more well known. For hybrid vehicles to increasingly become commercially adopted, these vehicles need to provide the same features and comforts as current traditional vehicles. In order to achieve maximum efficiency, hybrid vehicles employ a start/stop strategy, meaning the vehicle's internal combustion engine shuts down to conserve energy during normal idle conditions. During this period, it is still important to maintain comfort in the vehicle. In order to keep the cabin comfortable during cool temperatures, coolant is generally circulated through the heater core to provide cabin heat. However, in warm weather climates, the only method for keeping the cabin cool is by running the internal combustion engine to drive the compressor of an air conditioning system. Vehicles on the road today with such start/stop strategies allow the consumer to keep the engine running, while stopped at idle conditions, to maintain cabin comfort. Unfortunately, running the engine during vehicle idle periods eliminates the fuel economy savings obtained by shutting off the engine during idle operation.

As seen from the above, it is apparent that there exists a need for an improved climate control system for hybrid vehicles.

SUMMARY

In satisfying the above need, as well as overcoming the enumerated drawbacks and other limitations of the related art, the present invention provides a system for controlling the climate within the passenger cabin of a hybrid vehicle. The system includes a thermoelectric module, a heat exchanger, a pump, and a valve.

The thermoelectric module includes thermoelectric elements, powered by electric energy, that emit or absorb heat energy based on the polarity of the electrical energy provided. A tube containing coolant runs proximate to the thermoelectric elements. To aid in the transfer of heat energy, a blower is provided to generate an air flow across the thermoelectric elements and the tube. The coolant is provided from the thermoelectric module to a heat exchanger that heats or cools the air flow provided to the cabin of the vehicle. The pump pressurizes the coolant flow through the tube and coolant lines, and in a cooling mode, the valve is configured to selectively bypass the engine coolant system of the vehicle.

In another aspect of the present invention, the system includes a heater core and an evaporator in fluid communication with the heat exchanger. The air flow to the passenger cabin may be supplementally heated by the heater core or supplementally cooled by the evaporator.

In another aspect of the present invention, the system includes a controller in electrical communication with the thermoelectric module. The controller is configured to switch the polarity of electrical energy supplied to the thermoelectric module to alternatively heat or cool the coolant. In addition, the controller is configured to direct electrical energy generated by a regenerative braking system to the thermoelectric module for use in controlling the interior climate of the vehicle.

Further objects, features and advantages of this invention will become readily apparent to persons skilled in the art after a review of the following description, with reference to the drawings and claims that are appended to and form a part of this specification.

DETAILED DESCRIPTION OF PREFERRED EMBODIMENTS

Figure 1:
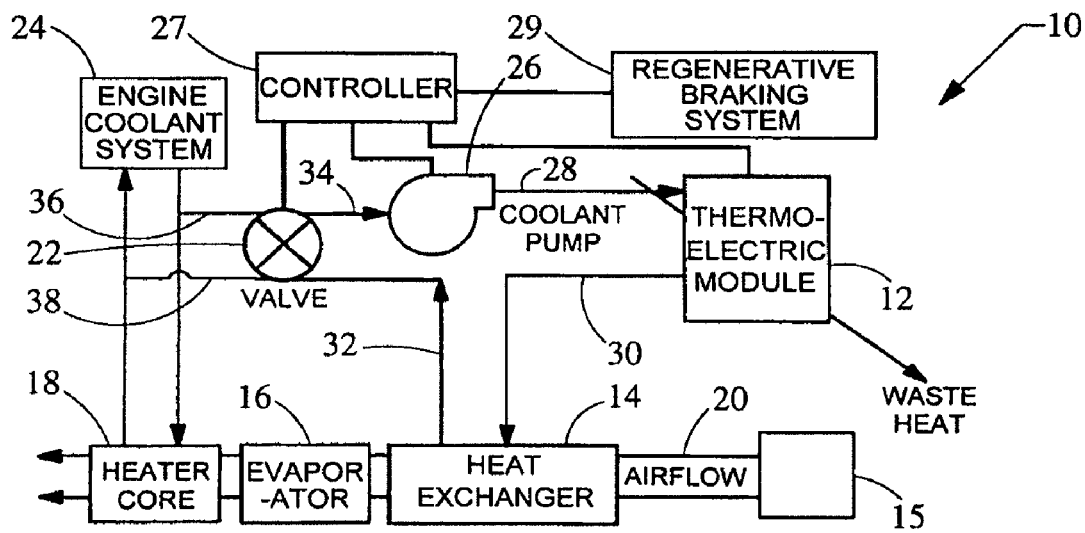
FIG. 1 is a block diagram of a climate control system, in a supplemental cooling mode, embodying the principles of the present invention.

Referring now to FIG. 1, a system embodying the principles of the present invention is illustrated therein and designated at 10. As its primary components, the system 10 includes a thermoelectric module 12, a heat exchanger 14, an evaporator 16, a heater core 18, a valve 22, a coolant pump 26, and a controller 27. As further discussed below, the thermoelectric module 12, in conjunction with the heat exchanger 14, allows the system 10 to provide heating or cooling with the internal combustion engine shut off, or alternatively, to provide supplemental heating or cooling while the internal combustion engine is running.

Figure 2:
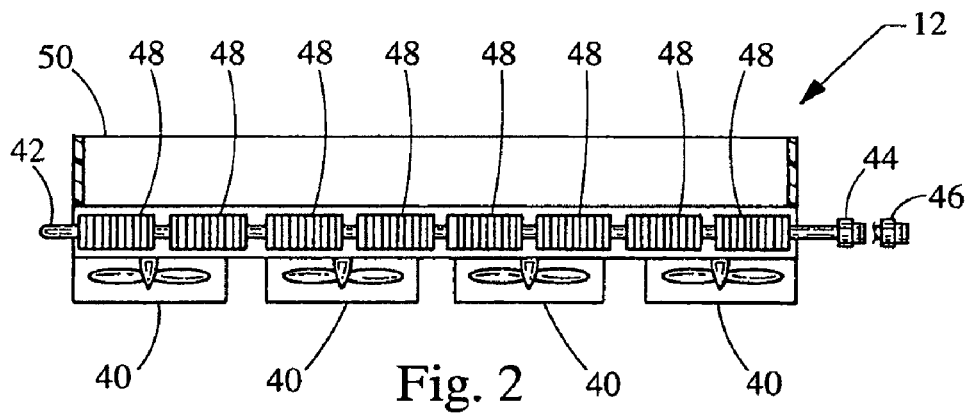
FIG. 2 is a sectional front view of a thermoelectric module embodying the principles of the present invention.

Now referring to FIG. 2, a sectional view of the thermoelectric module 12 is provided. The thermoelectric module 12 includes a series of thermoelectric elements 48 that generate a temperature change from electrical energy. If the electrical energy is provided in one polarity, the thermoelectric elements 48 will generate heat energy causing a rise in the ambient temperature around the thermoelectric elements 48. Alternatively, if electrical energy is provided to the thermoelectric elements 48 in an opposite polarity, the thermoelectric elements 48 will absorb heat energy, thereby cooling the ambient temperature around the thermoelectric elements 48. To transfer heating or cooling from the thermoelectric elements 48, a heat transfer medium, namely coolant, flows through a coolant tube 42 located proximate to the thermoelectric elements 48. To aid in this heat transfer to the coolant, one or more blowers 40 generate an air flow across the thermoelectric elements 48 and the coolant tube 42. In addition, an air scoop 50 may be provided to direct air leaving or entering the thermoelectric module 12. The coolant is provided to the thermoelectric elements 48 circulates through an inlet connection 44 to the rest of the system through an outlet connection 46, thereby enabling the transferring of the temperature change generated by the thermoelectric elements 48.

Referring again to FIG. 1, the thermoelectric module 12 is in fluid communication, via the coolant, with the heat exchanger 14 along line 30. The blower 15 creates an air flow 20 across the heat exchanger 14, and the air flow 20 extracts heating or cooling from the coolant supplied by the thermoelectric module 12 thereby altering the temperature of the air flow 20. In a heating mode, the thermoelectric module 12 provides heated coolant thereby heating the air flow 20. Alternatively in a cooling mode, the thermoelectric module 12 provides cooled coolant, thereby cooling the air flow 20. From the heat exchanger 14 the air flow 20 is communicated over heat transfer surfaces of both the evaporator 16 and heater core 18.

The coolant exits the heat exchanger 14 along line 32 and is provided to valve 22 that selectively allows the coolant to flow along line 38 into the engine coolant system 24 or back to the coolant pump 26. Generally, the engine coolant system 24 will heat the coolant and return a portion of the coolant along line 36 to the heater core 18 and to the valve 22 which passes it back to the coolant pump 26. Alternatively, the valve 22 can solely direct the coolant from line 32 directly to line 34, bypassing the engine coolant system 24. This latter flow circuit is particularly beneficial in the cooling mode of the system 10.

The controller 27 allows the system to work in multiple heating and cooling modes. For example, the controller 27 can switch the polarity of the electrical energy provided to the thermoelectric module, thereby heating the coolant with one polarity, and cooling the coolant with the opposite polarity. In addition, the controller 27 can manipulate the valve 22 to bypass the engine cooling system 24 in cooling mode, thereby isolating the coolant from the heat generated by the engine in the engine coolant system 24.

The controller 27 is also connected to a regenerative braking system 29. The regenerative braking system 29 generates electrical energy from the kinetic energy of the vehicle as the vehicle is slowed down. The controller 27 can direct the energy from the regenerative braking system 29 to an energy storage device, a battery, (not shown) or directly to the thermoelectric module 12, providing an ample source of power to adjust the climate of the vehicle. If provided directly to the thermoelectric module 12, the controller 27 can change the polarity of the electrical energy provided from the regenerative braking system 29 allowing the energy to be used by the thermoelectric module 12 in both heating and cooling modes.

Figure 3:
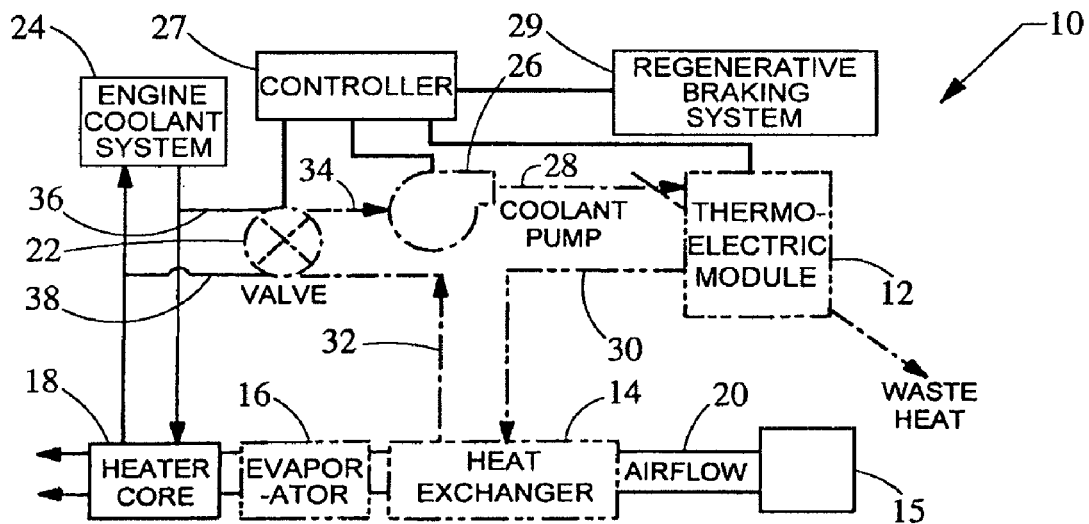
FIG. 3 is a block diagram of a climate control system, in a supplemental cooling mode, embodying the principles of the present invention.

Now referring to FIG. 3, the system 10 is shown in a supplemental cooling mode while the internal combustion engine is running. During "engine on" supplemental cooling, the thermoelectric module 12 is used in conjunction with the evaporator 16 to cool the passenger cabin of the vehicle. The combined use of the thermoelectric module 12 and the evaporator 16 provides a faster time to comfort. As illustrated in FIG. 3, the lines with a single small dash convey heated coolant from the heat exchanger 14 while the lines with two smaller dashes convey cooled coolant to the heat exchanger 14.

In the "engine on" supplemental cooling mode, the coolant flows through the thermoelectric module 12, where heat is removed from the coolant, and thereafter along line 30 to the heat exchanger 14. The heat exchanger 14 cools the air flow 20 which is then provided to the evaporator 16 for additional cooling before it flows to the passenger cabin of the vehicle. From the heat exchanger 14, coolant flows along line 32 to the valve 22, which is manipulated by the controller 27 to bypass the engine coolant system 24 thereby isolating the coolant from the heat generated by the engine. From the valve 22 the coolant flows along line 34 to the coolant pump 26 where the coolant flow is pressurized then provided back to the thermoelectric module 12 along line 28. In this mode of operation, the thermoelectric module 12 operates for the first couple minutes to quickly pull down the temperature of the air flow 20. If the temperature of the air coming into the heat exchanger 14 is less than the temperature of the air flowing into the thermoelectric module 12, the thermoelectric module 12 and pump 26 are not operated thereby conserving vehicle energy.

Figure 4:
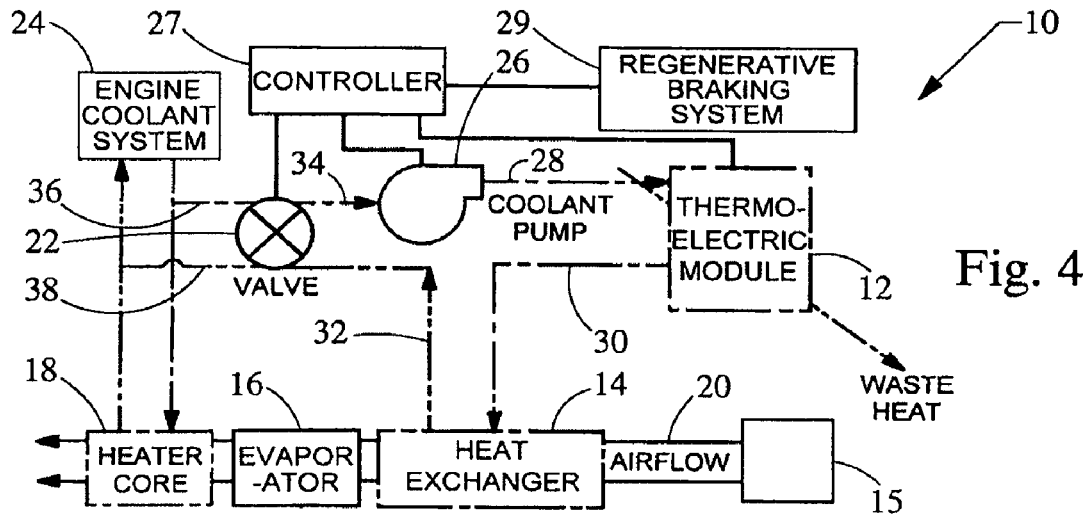
FIG. 4 is a block diagram of a climate control system, in a supplemental heating mode, embodying the principles of the present invention.

The system 10 in "engine on" supplemental heating mode is seen in FIG. 4. In the "engine on" supplemental heating mode, the thermoelectric module 12 is used in conjunction with the heater core 18. Using the thermoelectric module 12 in combination with the heater core 18 provides a faster time to comfort. Warm coolant from the engine is pumped through the thermoelectric module 12 where further heat is added. The coolant flows from the thermoelectric module 12 along line 30 to the heat exchanger 14, upstream of the heater core 18. The heat exchanger 14 first heats the air flow 20 that is received by the heater core 18. The heater core 18 emits heat from the engine coolant system 24 to further heat the air flow 20 before it is provided to the passenger cabin of the vehicle.

Coolant from the heat exchanger 14 is passed along line 32 to the valve 22, which in the supplemental "engine on" heating mode, allows coolant to return to the engine coolant system along line 38. The engine coolant system 24 provides heat from the engine to the coolant, some of which then flows to the heater core 18 and along line 36 to the valve 22. From the valve 22, the coolant flows along line 34 through the coolant pump 26 and returns along line 28 to the thermoelectric module 12. If the engine coolant system 24 provides sufficient means for pumping the coolant through the system, the coolant pump 26 is deactivated in this mode. Preferably, the thermoelectric module 12 operates for the first couple of minutes of heat up, and ceases to operate when the temperature of the coolant from the engine alone reaches the desired temperature to provide proper passenger cabin heating.

Figure 5:
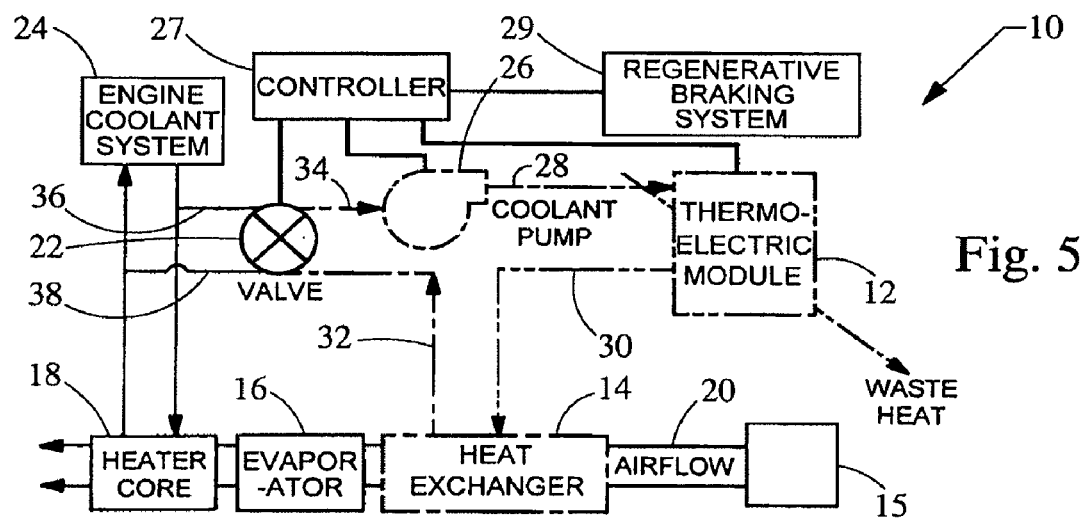
FIG. 5 is a block diagram of a climate control system, in an engine off cooling mode, embodying the principles of the present invention.

Now referring to FIG. 5, an "engine off" cooling mode is provided. The "engine off" cooling mode is used to maintain a comfortable cabin for a limited amount of time during an idle engine shutdown. In this mode, the evaporator is non-operative as the engine has been shut down. The cooling provided by the thermal inertia in the coolant and the thermoelectric module 12 allows the engine to shutdown and save fuel, while still allowing the passenger cabin to be cooled.

Coolant flows through the thermoelectric module 12 where heat is removed from the coolant. From the thermoelectric module 12, the coolant flows along line 30 to the heat exchanger 14. Heat is absorbed by the coolant from the air flow 20 in the heat exchanger 14. The coolant flows from the heat exchanger 14 along line 32 to the valve 22. Manipulated by the controller 27 to bypass the engine coolant system 14, the valve 22 isolates the coolant from the engine heat. The coolant flows from the valve 22 along line 34 back to the coolant pump 26, which generates coolant flow by pressurizing the coolant in the lines. The coolant is then received back by thermoelectric module 12 along line 28, where heat is absorbed from the coolant again.

The controller 27 monitors vehicle speed and braking to predict if a stop is imminent. If a stop is predicted, regenerating braking energy from the regenerative braking system 29 is used by the thermoelectric module 12 to cool the coolant. During the stop, the thermoelectric module 12 continues to operate to maintain the cool coolant temperature as heat is added from the cabin.

Figure 6:
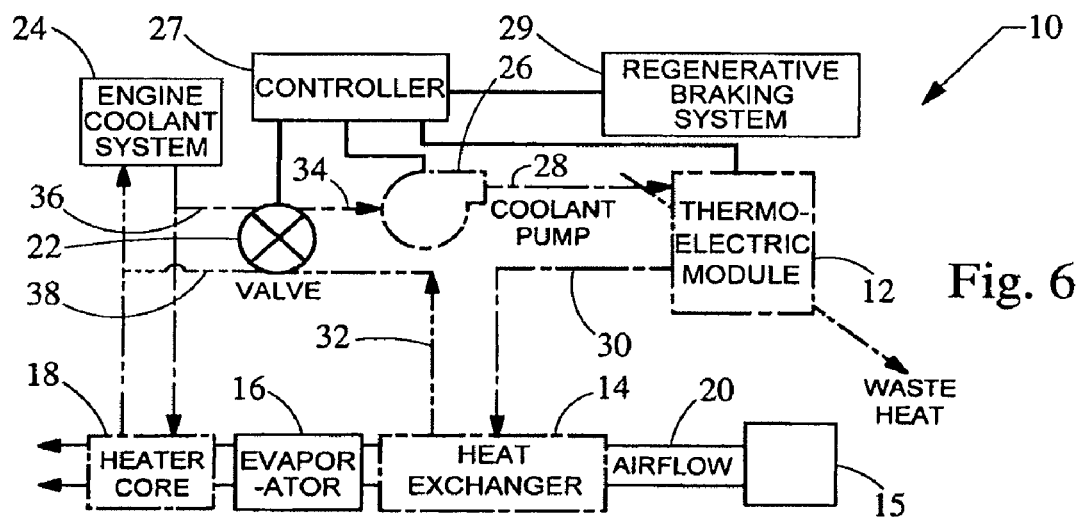
FIG. 6 is a block diagram of a climate control system, in an engine off heating mode, embodying the principles of the present invention.

Now referring to FIG. 6, an "engine off" heating mode is schematically shown. The "engine off" heating mode is used to maintain a comfortable cabin temperature for a limited amount of time during an idle engine shutdown. The heat provided by the thermoelectric module 12, the thermal inertia in the coolant, and the thermal inertia in the engine block allows the system 10 to heat the cabin of the vehicle while allowing the engine to shutdown and save fuel.

In this mode of operation, warm coolant from the engine is pumped by the coolant pump 26 through the thermoelectric module 12 where heat is added. Coolant flows from the thermoelectric module 12 along line 30 to the heat exchanger 14. In the heat exchanger 14, heat is absorbed by the air flow 20 from the coolant. The heated air flow 20 is then provided to the heater core 18 where before the air flow 20 is provided to the cabin, further heat is absorbed from the coolant provided by the engine coolant system 24, The cooled coolant then flows from the heat exchanger 14 along line 32 to the valve 22, which is opened to provide the coolant to the engine coolant system 24. The engine coolant system 24 adds heat from the engine block to the coolant, which is returned to the heater core 18 and along line 36 to the valve 22 and the coolant pump 26. If the engine coolant system 24 has a pump to provide sufficient coolant pressure through the system 10, the coolant pump 26 is deactivated. From the pump 26, the coolant flows along line 28 back to the thermoelectric module 12 where further heat is added. In addition, the controller 27 monitors the vehicle speed and braking to predict if a stop is imminent. If a stop is predicted, the regenerative braking energy from the regenerative braking system 29 is used by the thermoelectric module 12 to heat the coolant. During the stop, the thermoelectric module 12 continues to operate and maintain the warm coolant temperature as heat is removed from the cabin.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

What is claimed is:

1. A method for controlling the interior climate of a hybrid vehicle having an engine and an engine coolant system, the method comprising the steps of:
   supplying electrical energy to at least one thermoelectric element of a thermoelectric module to generate a temperature change;
   pumping coolant through a coolant tube in thermal communication with the thermoelectric module;
   blowing air across the thermoelectric element and the coolant tube to create a change of temperature of the coolant in the coolant tube; receiving the coolant in a heat exchanger;
   creating an air flow across the heat exchanger;
   receiving the air flow over an evaporator to supplement cooling in a cooling mode;
   receiving the air flow over a heater core to supplement heating in a heating mode;
   in a cooling mode, selectively isolating the coolant in the coolant tube from coolant in the engine coolant system; and
   in a heating mode, selectively coupling the coolant in the coolant tube with the engine coolant system.

2. The method of claim 1, wherein in the cooling mode the engine is off.

3. The method of claim 1, wherein in the cooling mode the engine is on.

4. The method of claim 1, wherein in the heating mode the engine is off.

5. The method of claim 1, wherein in the heating mode the engine is on.

6. The method of claim 1, wherein the step of supplying electrical energy provides the electrical energy in a first polarity during the heating mode and in a second polarity during the cooling mode.

7. The method according to claim 1, further comprising the step of directing energy from a regenerative braking system to the thermoelectric module to generate a temperature change.

\* \* \* \* \*

UNITED STATES PATENT AND TRADEMARK OFFICE
CERTIFICATE OF CORRECTION

PATENT NO. : 7,870,892 B2
APPLICATION NO. : 12/131853
DATED : January 18, 2011
INVENTOR(S) : Peter R. Gawthrop Page 1 of 2

It is certified that error appears in the above-identified patent and that said Letters Patent is hereby corrected as shown below:

At Page 6, lines 6-27, Change "1. A method for controlling the interior climate of a hybrid vehicle having an engine and an engine coolant system, the method comprising the steps of:

supplying electrical energy to at least one thermoelectric element of a thermoelectric module to generate a temperature change;

pumping coolant through a coolant tube in thermal communication with the thermoelectric module;

blowing air across the thermoelectric element and the coolant tube to create a change of temperature of the coolant in the coolant tube; receiving the coolant in a heat exchanger;

creating an air flow across the heat exchanger;

receiving the air flow over an evaporator to supplement cooling in a cooling mode;

receiving the air flow over a heater core to supplement heating in a heating mode;

in a cooling mode, selectively isolating the coolant in the coolant tube from coolant in the engine coolant system; and in a heating mode, selectively coupling the coolant in the coolant tube with the engine coolant system."

to --1. A method for controlling the interior climate of a hybrid vehicle having an engine and an engine coolant system, the method comprising the steps of:

supplying electrical energy to at least one thermoelectric element of a thermoelectric module to generate a temperature change;

pumping coolant through a coolant tube in thermal communication with the thermoelectric module;

Signed and Sealed this
Thirtieth Day of August, 2011

David J. Kappos
*Director of the United States Patent and Trademark Office* blowing air across the thermoelectric element and the coolant tube to create a change of temperature of the coolant in the coolant tube;

receiving the coolant in a heat exchanger;

creating an air flow across the heat exchanger;

receiving the air flow over an evaporator to supplement cooling in a cooling mode;

receiving the air flow over a heater core to supplement heating in a heating mode;

in a cooling mode, selectively isolating the coolant in the coolant tube from coolant in the engine coolant system; and in a heating mode, selectively coupling the coolant in the coolant tube with the engine coolant system.--.